US012556357B2

(12) United States Patent
Haverkamp et al.

(10) Patent No.: US 12,556,357 B2
(45) Date of Patent: Feb. 17, 2026

(54) FLEXIBLE SYNCHRONIZATION OF TIME-OF-DAY COMPONENTS

(71) Applicant: INTERNATIONAL BUSINESS MACHINES CORPORATION, Armonk, NY (US)

(72) Inventors: Frank Haverkamp, Tuebingen (DE); Thilo Maurer, Nufringen (DE); Markus Buehler, Schoenbuch (DE); Michael Klaus Kroener, Ehningen (DE); Timothy Lindquist, Rochester, MN (US); Tristan Müller, Tübingen (DE); Todd A. Greenfield, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 18/612,150

(22) Filed: Mar. 21, 2024

(65) Prior Publication Data
US 2025/0300801 A1    Sep. 25, 2025

(51) Int. Cl.
H04L 7/00    (2006.01)
G06N 10/00    (2022.01)

(52) U.S. Cl.
CPC ........... H04L 7/0016 (2013.01); G06N 10/00 (2019.01)

(58) Field of Classification Search
CPC ............................. G06N 10/00; H04L 7/0016
See application file for complete search history.

(56) References Cited

U.S. PATENT DOCUMENTS 5,636,373 A    6/1997  Glendening et al.
8,438,415 B2   5/2013  Engler et al.
(Continued)

FOREIGN PATENT DOCUMENTS

EP    2375834 B1    4/2019

OTHER PUBLICATIONS

Cota, Emilio G., "White Rabbit Specification: Draft for Comments," Version 2.0, Jun. 7, 2011, pp. 1-69.
(Continued)

Primary Examiner — Terrell S Johnson
(74) Attorney, Agent, or Firm — Erik Johnson, Esq.; Matthew M. Hulihan, Esq.; Heslin Rothenberg Farley & Mesiti P.C.

(57) ABSTRACT

Synchronizing time-of-day (TOD) between TOD components includes issuing an order for a plurality of TOD components, each including a local time, an offset, and an effective time as a sum of the local time and the offset. The effective time of a reference TOD component is the reference time to which target TOD component(s) are to be synchronized. The order directs each of the plurality of TOD components to synchronously, at a point in time, snapshot its local time. This provides a snapshot of the effective time of the reference TOD component, and thus the reference time. The synchronizing synchronizes each target TOD component to the reference time by setting the respective offset as a difference between the target TOD component's snapshot local time and the snapshot of the reference time. Based on the synchronizing, the effective times of the plurality of TOD components match and are the reference time.

20 Claims, 4 Drawing Sheets

(56) References Cited

U.S. PATENT DOCUMENTS

| | | | |
|---|---|---|---|
| 8,873,589 B2 | 10/2014 | Aweya et al. | |
| 10,374,786 B1* | 8/2019 | Mustiere | H04J 3/0635 |
| 10,855,387 B2 | 12/2020 | Luo et al. | |
| 11,671,082 B2 | 6/2023 | Cohen et al. | |
| 11,747,854 B2 | 9/2023 | Mothuizen | |
| 2007/0266119 A1* | 11/2007 | Ohly | H04J 3/0664 |
| | | | 709/208 |
| 2008/0183898 A1 | 7/2008 | Carlson et al. | |
| 2022/0029778 A1* | 1/2022 | Chattopadhyay | H04J 3/0661 |
| 2023/0012797 A1 | 1/2023 | Kong et al. | |
| 2023/0342647 A1 | 10/2023 | Haverkamp et al. | |

OTHER PUBLICATIONS

"Precision Time Protocol." In Wikipedia. Retrieved Feb. 29, 2024, from https://en.wikipedia.org/wiki/Precision_Time_Protocol, pp. 1-4.

* cited by examiner

FLEXIBLE SYNCHRONIZATION OF TIME-OF-DAY COMPONENTS

BACKGROUND

Quantum computers are processing devices with chips that compute with quantum-mechanical bits referred to as qubits. The qubits are controlled by real-time controllers that send out radio-frequency waves to sets of qubits at precisely-defined points in time. This real-time control is to be performed in a time-controlled fashion. For this reason, it is important that all of the controllers of the quantum computer operate according to a synchronized time, to ensure proper orchestration of the sending of the waves to the qubits. A common technique to achieve this is by implementing a shared time-base, referred to as a reference 'time-of-day' (TOD), within every real-time controller. The controllers are often embedded and implemented by field-programmable gate arrays (FPGAs), which are physical structures that receive a clock signal that drives the progression of the TOD. One FPGA could implement one or more such controllers.

SUMMARY

Shortcomings of the prior art are overcome and additional advantages are provided through the provision of a computer-implemented method. The method issues an order for a plurality of time-of-day (TOD) components of a system. The plurality of TOD components include (i) a reference TOD component and (ii) one or more target TOD components to be synchronized to a reference time provided by the reference TOD component. Each TOD component of the plurality of TOD components includes a local time and an offset that are independent of each other TOD component of the plurality of TOD components. Each TOD component of the plurality of TOD components also includes an effective time as a sum of the local time and the offset of the TOD component. The effective time of the reference TOD component is the reference time to which the one or more target TOD components are to be synchronized. The issued order directs each TOD component of the plurality of TOD components to synchronously, at a point in time, snapshot its local time as the local times of the plurality of TOD components continue to progress. The snapshot local time of the reference TOD component together with the offset of the reference TOD component provide a snapshot of the effective time of the reference TOD component, and thus a snapshot of the reference time, at the point in time. The method also synchronizes the one or more target TOD components to the reference time. The synchronizing synchronizes, for each target TOD component of the one or more target TOD components, the effective time of the target TOD component to the reference time by setting the offset of the target TOD component as a difference between the snapshot local time of the target TOD component and the snapshot of the reference time. Based on the synchronizing, the effective times of the plurality of TOD components match and are the reference time.

Additional aspects of the present disclosure are directed to systems and computer program products configured to perform the methods described above and herein. The present summary is not intended to illustrate each aspect of, every implementation of, and/or every embodiment of the present disclosure. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for flexible synchronization of a time-of-day between TOD components for controllers of a system, for instance controllers of a quantum computing system.

Figure 1:
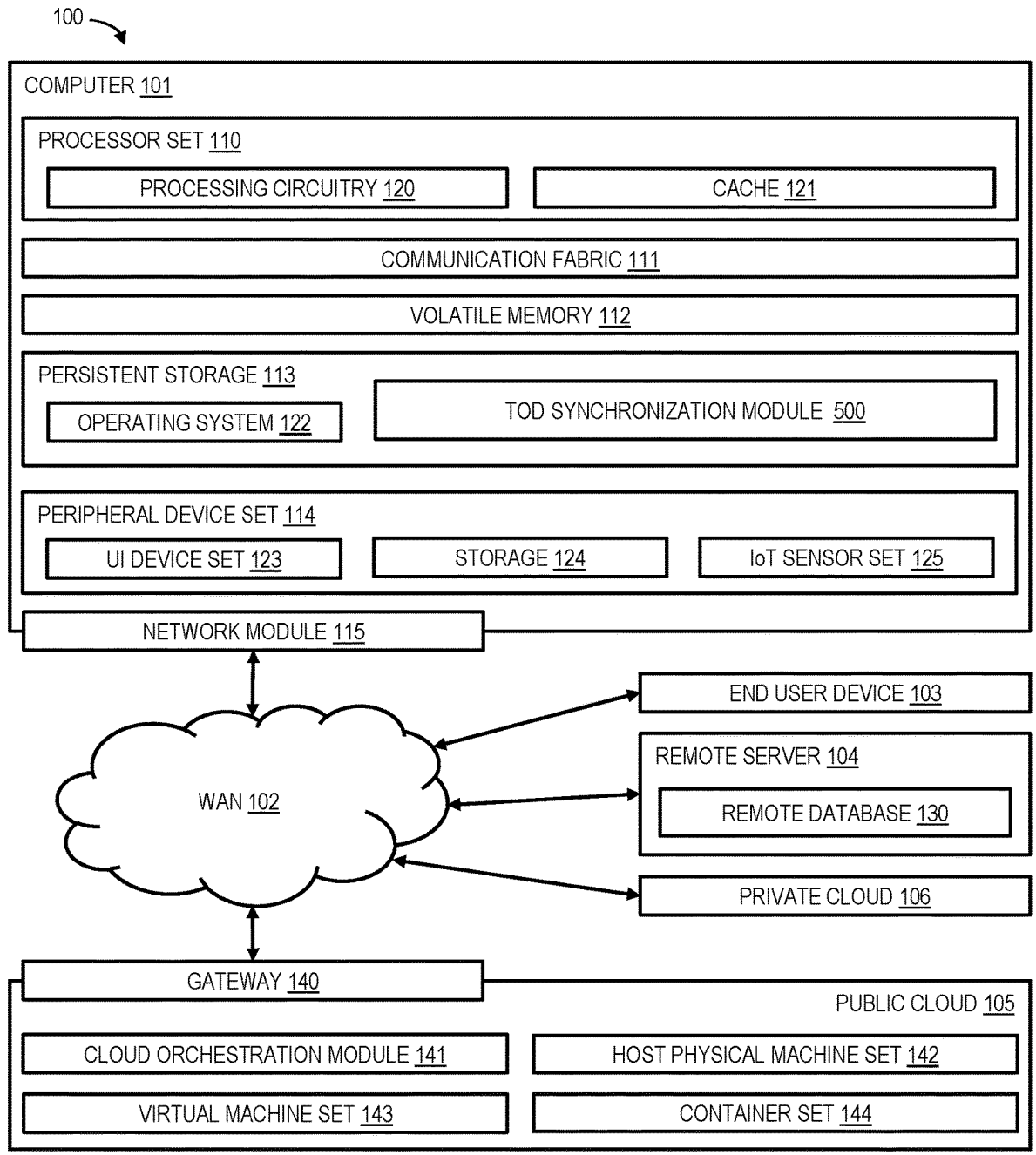
FIG. 1 depicts an example computing environment to incorporate and/or use aspects described herein.

Initially, one or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as TOD synchronization module 500. In addition to block 500, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 500, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 500 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 500 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above in FIG. 1 is only one example of a computing environment to incorporate, perform, and/or use aspect(s) of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible. In some embodiments, one or more aspects of TOD synchronization module 500 are performed or implemented in, by, or in conjunction with programmable logic, such as FPGAs, or other types of integrated circuits of a computer system. In this regard, aspects of TOD synchronization described herein could be performed in whole or in part using any appropriate combination of hardware and/or software, including, for instance, programmable logic, such as software/hardware residing as a component of computer 101 of FIG. 1, for instance.

An example conventional approach for time keeping in a quantum system with a single time-of-day and a set of controllers controlling a quantum chip is to set each TOD component for the controllers to a common value and send an external synchronization pulse to begin advancing the TOD (implemented using a TOD counter, for instance) of each TOD component. For example, the synchronization process might initially prime TOD logic of each TOD component to set/reset the TOD component's counter, representing the TOD component's internal representation of current time, to an initial value. An example initial value is zero (0). Then, an external component sends a synchronization pulse to each TOD component to begin advancing its respective counter according to a clock signal that is common to all of the TOD components. All controllers therefore share the same TOD based on each of the TOD components having been initially set to a common value, synchronously started, and advanced in unison by the common clock.

To verify that all controllers are synchronized, TOD logic of the TOD components enables taking snapshots of the local times of the TOD components for instance snapshots of their TOD counters. This works by configuring each TOD component to store a copy of its TOD (as a snapshot of its counter value) when it receives yet another synchronization pulse. The synchronization pulse causes each TOD component to synchronously snapshot its respective local time.

This conventional practice can present problems for systems undergoing service or recovery. Quantum computers in particular are growing in their number of available qubits and this in turn increases the number of control systems involved. It may be desired to service component parts of the quantum system during its operation, since re-initializing the entire quantum system can be cumbersome and costly in terms of time. A similar situation might arise when a controller is facing a restart due to an unforeseeable situation like a software problem. In each of these cases, re-synchronization of the TOD component that was serviced, restored, restarted, etc. is necessary. However, some parts of the system, for instance partition(s) of the quantum computer, might still be run as other parts of the system (for instance, another partition) undergoes servicing or recovery. It may be beneficial for running operations to remain undisturbed by the re-synchronization of the serviced/restarted component, but the conventional practice discussed above requires all of the TOD components to be stopped/reset and synchronously started again.

In the particular situation of partitions, one approach may be to provide individual TOD components per partition with their own time domain. This would enable restart/service of the affected component, e.g., partition of controllers, and reinitialization of its TOD component(s) without affecting the other component(s), since separate TOD components per partition would provide different TOD domains per partition. In other words, if a controller of one partition is to be serviced or restored, the partition could be downed and its TOD reset after if comes back up. However, this comes with drawbacks. TOD logic would need to be duplicated for each partition so that the components within a partition can individually synchronized. Further, maintaining multiple TODs can be complicated. For instance, problems when debugging may result since events or trace arrays would be tagged with individual TODs and the relationship between those could be difficult to determine.

Accordingly, synchronization approaches discussed herein provide a common time (reference time, also referred to herein as "reference TOD") for all real-time controllers of the quantum system, and regardless whether the system is partitioned or how many partitions exist. Further, aspects discussed herein enable synchronization of target TOD components to an existing pool of synchronized TOD components even when those target TOD components are being added to the pool (initially configured and synchronized to the reference time) or when they are being resynchronized to the reference time, for instance after their associated controllers have been serviced or undergone recovery actions.

In accordance with aspects described herein, TOD logic of a TOD component is extended by adding an offset, for instance as a value maintained in an additional register of the TOD component or associated with the TOD component. Each TOD component maintains a local time (also referred to as the TOD component's "local TOD"), for instance one implemented by a counter of the TOD component, and an offset, with each of the local time and offset being independent of the other TOD components and their respective local times and offsets. A TOD component utilizing the offset approach described herein also uses an effective time (also referred to herein as "effective TOD") determined as a function of its local time and the offset, for instance a sum of the local time and offset. Since the local times across the TOD components of the system can vary, the offset of each TOD component can be configured/set accordingly so that the effective times of all TOD components using the offset logic match to the common reference time for the system. In this manner, for each TOD component, its offset can be set such that the TOD component's individual local time and its offset (which can each vary compared to the other TOD components) totals an effective TOD that matches to the reference TOD for the system. The effective TODs of the TOD components therefore match to each other and the reference time.

By providing TOD components with respective offsets, their independent local times need not conform to each other. Instead, a TOD component's offset can represent the adjustment to be made to its local time in order to provide the TOD component with an effective time that matches the reference time being used. This enables synchronization TOD components in a manner that avoids setting each TOD component's local time to a defined value, e.g. reset it to 0, and waiting for a synchronization pulse to synchronously start the local times of the TOD components. Instead, the local time of each TOD component can start at any arbitrary value and run from any point in time prior to synchronization. The TOD component's effective time can be determined as a function of its local time and the offset that it maintains, the offset representing the difference between its local time and the reference time being used. Thus, in accordance with aspects described herein, each TOD component of a group has/maintains its own respective local time (for instance as its counter value) and offset, with each being independent of the other TOD components, their local times and offsets. The local time of each TOD component is driven by a clock signal that is common to the TOD components of the system, and therefore the TOD components remain in sync.

As explained herein, the synchronization between different TOD components in the system can being done by using a snapshot feature, for instance one that may already be provided by TOD components of the system. The snapshot feature enables each TOD component to snapshot its local time and provide this for comparison to a synchronously-snapshot reference time to which each of the TOD components are to be synchronized by way of setting/adjusting an offset. The comparison could be used to determine, for each TOD component, a difference between its snapshot local time and the snapshot of the reference time, the difference being the offset that the TOD component is to use relative to its local time to provide an effective time for the TOD component that matches to the reference TOD.

Figure 2:
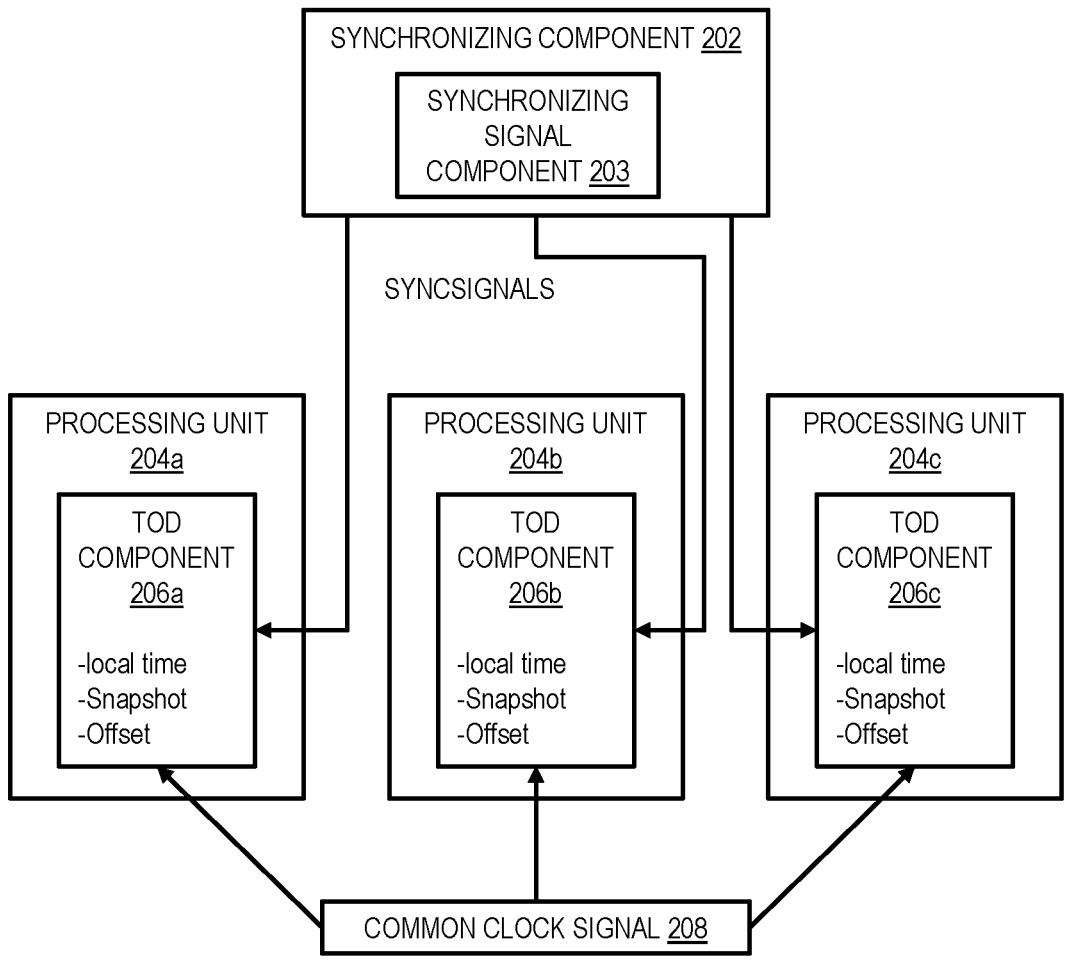
FIG. 2 depicts an example synchronization scheme for synchronizing independent processing units, in accordance with aspects described herein.

FIG. 2 depicts an example synchronization scheme for synchronizing independent processing units ('actors') 204a, 204b, 204c. By way of specific example, each processing unit (PU) 204a, 204b, 204c may be implemented at least in part by a set of hardware, for instance one or more FPGAs. Each of PU 204a, 204b, 204c has an associated TOD component with TOD logic. Here, PU 204a has associated TOD component 206a, PU 204b has associated TOD component 206b, and PU 204c has associated TOD component 206c. In the context of a quantum computing system, each processing unit could correspond to a respective one or more controllers for controlling qubits.

A synchronizing component 202 (also referred to herein as "synchronization component") is any component that performs a synchronization process in accordance with aspects described. The synchronizing component 202 could be part of the system in which the PUs are a part, or separate from such system. In some examples, the synchronizing component 202 is a system or device other than the TOD components to be synchronized, and is not one of the controllers communicating with the qubits of a quantum system, though in other examples it could be either. In this example, synchronizing component 202 includes a synchronizing signal component 203 that the synchronizing component 202 orders to send synchronization signals (SyncSignals) to the PUs as described herein. In other examples, the synchronizing signal component 203 is a separate component from the synchronizing component 202 but the two are in wired or wireless communication though communications link(s), for instance a network connection as one example, and the synchronizing component 202 can issue orders to initiate the sending of syncsignals to the PUs.

Common clock signal 208 clocks each TOD component 206a, 206b, 206c on a common schedule. It may be implemented by a clock/oscillator component, for instance. As an example, a hardware unit sends a clock signal to the TOD components on regular intervals to commonly clock the individual TOD components.

The synchronizing component 202 orders the sending of SyncSignals by the synchronization signal component 203 to the TOD components 206a, 206b, 206c associated with the PUs 204a, 204b, 204c. Synchronization signals provide synchronized triggers to the individual TOD components to perform defined functions. One function may be a TOD reset that causes the TOD component to reset its internal local time (e.g., reset its counter). The reset might cause the counter to reset to 0, for example. The TOD reset primes the TOD component to wait for a signal that invokes another function of the TOD component—the TOD start function. The TOD start function causes the TOD component to being varying (e.g., incrementing) its counter based on the common clock signal. By way of specific example, the counter is incremented by 1 on receipt of each clock pulse of the signal. The TOD reset and TOD start functions can be used in a conventional approach to TOD component synchronization discussed above, in which the local times of the group of TOD components are reset to a common value and then their local times are synchronously started. Because they are commonly clocked, their local times should match at any given point in time, and therefore they all use the same time as a common reference.

Yet another function is the TOD snapshot function. This causes the TOD component to 'snapshot' its local time, e.g., by capturing the value in its counter at a point in time when the signal is received, and storing/saving it. The local time will continue to progress on each clock pulse thereafter, but the retained snapshot will be the snapshot local time at the point in time of the syncsignal directing the snapshot to occur. This snapshot local time could be provided or otherwise made accessible to another device. For instance, the snapshot local time could be sent by the TOD component to the other device or read-out from the TOD component by the other device, as examples. The other device might be the synchronizing component 202, for instance.

When the local times of multiple TOD components are synchronously snapshot at a given point in time, this provides a snapshot of each such local time. These local times could differ from each other but nevertheless be used in conjunction with a respective offset for each TOD component in order to bring each TOD component's effective time into alignment with a common reference time, in accordance with aspects described herein. Each TOD component can be configured to use the effective time as a function (e.g., sum) of the TOD component's local time and the offset, and that effective time can be the reference time common to all of the TOD components.

To help exemplify aspects described herein, take an example system in which there are three TOD components to be synchronized—TOD components A, B, and C, all of which incorporate offset functionality described herein. Each TOD component is initiated and controlled by respective firmware. Assume that the firmware is brought up at different times such that the local times of the different TOD components. Table 1 below indicates the local time snapshots of TOD components A, B, and C at a given point in time, for instance as captured by the snapshot function.

TABLE 1

| Local Time Snapshots | | |
|---|---|---|
| TOD component A | TOD component B | TOD component C |
| 12 | 3 | 5 |

By the above, at the point in time when the snapshots are taken, A's snapshot local time is 12, B's snapshot local time is 3, and C's snapshot local time is 5. Since all three components are clocked by a common clock, the differences between them will generally remain the same over time unless a relevant change occurs.

The three components can be synchronized to a reference time. The reference time can be any desired time, for instance one provided by one of the involved TOD components or one provided by a different device. In this example, A's local time is used as the reference time. A is therefore a 'reference TOD component' as used herein, since reference time is determined based on A's local time. A respective offset for each component can be determined as: offset=snapshot reference time-snapshot local time. Table 2 below indicates the offsets determined for TOD components A, B, and C after synchronization:

TABLE 2

| Offsets After Synchronization | | |
|---|---|---|
| TOD component A | TOD component B | TOD component C |
| 0 | 9 | 7 |

A's offset is 0 because its local time is used as the reference time. Each component's offset can be maintained by the component, for example in a register, and used to determine an effective time for the component as effective time=local time+offset. The effective time of each component is to match the reference time, and therefore also the effective time of all other synchronized TOD components. Using this example, A's local time is also its effective time since its offset is 0. Thus, when the local time of component A is, say, 137, the local times of components B and C will be 128 and 130, respectively. The effective times of all components will all be 137, matching the reference time of 137 provided a component A's local time.

If reference time were something other than component A's local time, then component A would have a non-zero offset (assuming the reference time differed from A's local time). The other components could still be synchronized to this reference time by determining their offsets appropriately (as the difference between their snapshot local time and the snapshot of the reference time).

Now assume that component B goes down, is serviced, and then is restarted. Resynchronizing B to the reference time can be done similar to the synchronizing process carried out above. For instance, a synchronizing component issues an order for the components to snapshot their local times at a given point in time after B's restart. Table 3 below indicates example snapshot local times of A, B, and C at this given point in time.

TABLE 3

| Local Time Snapshots | | |
|---|---|---|
| TOD component A | TOD component B | TOD component C |
| 212 | 9 | 205 |

Here, component B's snapshot local time after restart renders the local time of B significantly less than the snapshot local time of component A, which is taken as the snapshot of the reference time. A new offset is determined for B as: offset=212−9=203. Thus, Table 4 below indicates the offsets determined for TOD components A, B, and C after B's offset is updated:

TABLE 4

| Offsets After Synchronization | | |
|---|---|---|
| TOD component A | TOD component B | TOD component C |
| 0 | 203 | 7 |

During B's service, components A and C remain in sync with the reference time. That is, C's offset remains 7 so that its snapshot effective time at the point in time reflected above is 205+7=212. Meanwhile, 212 is the snapshot local time of component A, which in this example continues to be used as the snapshot of the reference time, and component A's offset remains 0 because its local time continues to be used as the reference time in this example.

Note that it is not a requirement to snapshot component C's local time in this example, since it is already synchronized, has been running along with component A (the reference TOD component), and therefore should remain in sync with the reference time. However, if C's local time is snapshot at this point in time when B is resynchronized, the synchronizing component could, if desired, check to make sure that component C's offset remains proper, i.e., that component C's snapshot local time (205)+offset (7) remains the snapshot reference time of 212. If the sum does not equal the snapshot of the reference time, then this indicates that C is out of sync, and its offset could be set/adjusted at this point to be the difference between C's snapshot local time and the snapshot of the reference time. It is noted that this situation might be indicative of an error and therefore an alert could be raised, since the difference in local times of continually running, commonly clocked components (A and C in this example) is expected to remain constant but did not.

Component B in this example is a target TOD component that happens to be for resynchronizing to the reference time, but the approach can be the same for any other TOD component that is a target for synchronizing to the reference time. For instance, whenever a new TOD component is to be synchronized with the group, the same process of snapshotting local times and determining an offset for the new component can be performed to synchronize the new component to the reference time. Thus, snapshots of at least the reference time and the local time(s) of the target TOD component(s) to be synchronized are obtained, and then an offset for each such target TOD component is determined. As in the examples above where reference time is taken as the local time of the reference TOD component, the snapshot of the reference time may be the snapshot of the local time of the reference TOD component, and the offset for any target TOD component to be synchronized may be determined as: offset=snapshot of reference time−snapshot local time of the target TOD component.

In some examples, the synchronizing component that issues the snapshot order and performs the synchronizing can be a target TOD component itself. Using the example above in which B is to be resynchronized, B itself could issue order for the reference TOD component and itself to snapshot the reference time and its local time, respectively. The target TOD component could then synchronize itself to the reference time by performing the comparison (snapshot local time to snapshot reference time), and determining and setting its own appropriate offset.

It is also noted that the reference time could be updated or changed at various point in time, and the TOD components could resynchronized using the approach described herein. For instance, the reference time could be changed when synchronizing one or more target TOD components. In any case, it is desirable to first ensure that any TOD components to be synchronized/resynchronized are not in use by any running load at the time of the synchronization/resynchronization. As one specific example of updating the reference time, any desired TOD component could be selected to be a reference TOD component at any point in time. Using the example above in which B is resynchronized with A and C, component B could be selected to take-over as the reference TOD component. If B's local time were to be used as the new reference time, appropriate offsets for both A and C are determined based on A's and C's snapshot local times. Using the snapshot local times of Table 3, the snapshot of the reference time would be 9 (B's snapshot local time, which is also its effective time as its offset would be set to 0), and the offsets for A and C would be negative offsets to produce snapshot effective times of 9 for each of A and C, to match the snapshot reference time.

The offset being set to 0 is akin to the conventional approach (no offset) in which the time that the TOD component takes to be system time is its local time, i.e., there is no effective time in contrast to local time. Synchronization the conventional way is therefore still possible since TOD offsets could be set to zero.

Figure 3:
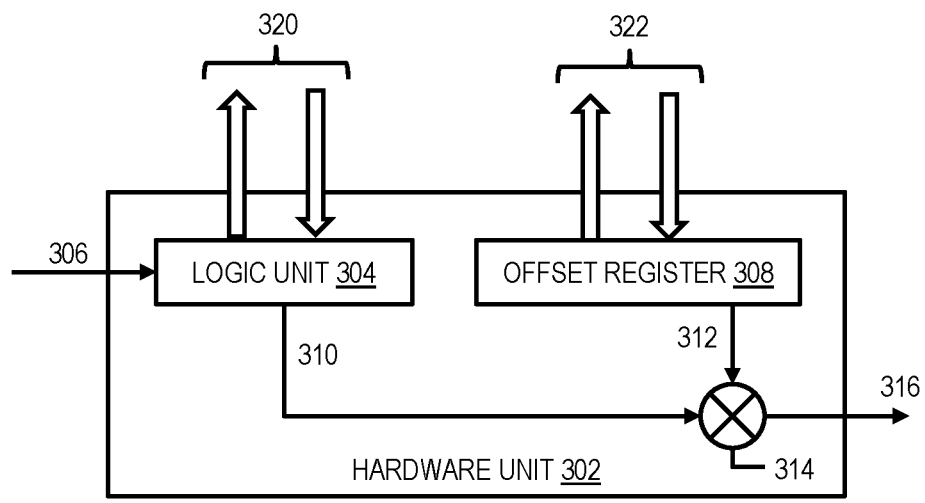
FIG. 3 depicts an example schematic representation of a hardware implementation for a TOD component with a provided offset, in accordance with aspects described herein.

FIG. 3 depicts an example schematic representation of a hardware implementation for a TOD component with a provided offset, in accordance with aspects described herein. Hardware unit 302 is implemented by hardware, for instance an FPGA, of a system, and includes a logic unit 304. Logic unit 304 provides a 'ticking' TOD, for instance as a counter that increments on receiving a clock pulse from an external clock. It also includes logic for implementing functions, such as TOD start, TOD reset, and TOD snapshot as discussed above, and TOD stop (to stop the counter). The functions may be initiated by an external trigger 306, such as from a synchronizing signal component.

In accordance with aspects described herein, a TOD component can maintain an offset in a register associated with the TOD component. Thus, hardware unit 302 includes an offset register 308 for storing/maintaining an offset (e.g., as a numerical value by which a local time of the logic unit 304 is to be modified to obtain an effective time). Thus, the logic unit 304 can provide a local time (along 310) and the offset register can provide the offset value (along 312). These can be provided for modification (e.g., summing) by function 314 to produce an effective time 316 used for timekeeping and time-related processing.

Here, the offset register 308 is maintained outside of the logic unit 304, and therefore the logic unit 304 may be unchanged, relative to the logic unit of a conventional TOD component, insofar as register space and/or hardware is concerned. In some alternative embodiments, the added offset register 308 is integrated into the logic unit 304 as part of the logic unit's register space to form the TOD component with an internal offset register.

In any case, the offset and the snapshot local time of a target TOD component can be made separately accessible to external components. In FIG. 3, separate bus interfaces 320, 322 are provided for accessing local time from logic unit 304 and offset from offset register 308, respectively. Separate access to these may be desirable when an actor is performing operations relative to one of them. For example, a synchronizing component or other component might desire to read-out a snapshot local time to calculate an offset for the TOD component and/or might desire to read-out the offset as part of a check to determine whether the offset or the effective time of the TOD component is correct.

Accordingly, an example approach for synchronizing target TOD component(s) to a reference time in accordance with aspects described herein may be as follows:

1. Prime TOD components (e.g., their logic units) to snapshot their local times: This readies the TOD components to snapshot their local times when a subsequent synchronization pulse is received. The TOD components here include at least two TOD components—the reference TOD component and one or more target TOD components that are to be synchronized to the reference time provided by the reference TOD component. Each of the target TOD components can include, independent of the other TOD components, a local time and an offset. Each TOD component has an effective time taken as a function (e.g., sum) of the local time and the offset of the TOD component. This effective time is what is to match the reference time, and therefore the effective times of the TOD components are to all match to the reference time. In addition, the reference TOD component could also include a 0 or non-zero offset, though this is not a requirement as long as the reference TOD component can provide a time (e.g., effective time) to be used as the reference time.

2. Send synchronization pulse: The TOD components snapshot their local times at a same point in time. This is triggered by a triggering component that is responsible for sending out a trigger-pulse to the TOD components. The trigger component delivers the pulse synchronously to each of the TOD components to ensure that each TOD component snapshots at a sufficiently precise same point in time.

3. Read snapshot times from the TOD components: The local times of the target TOD component(s) are read. A snapshot effective time of the reference TOD component can also be read to provide a snapshot of the reference time. In situations where the reference TOD component uses a 0 offset or does not include an offset, then the snapshot local time of the reference TOD component is read as the snapshot effective time of the reference TOD component, to be used as the snapshot of the reference time. If the reference TOD component includes an offset, this could be obtained too. For instance, there may be situations in which the offset of the reference TOD component is non-zero and the effective time therefore differs from the local time of the reference TOD component. In these situations, and if the reference time is taken to be the effective time of the reference TOD component (local time plus offset if present), then the offset and the snapshot local time can be read to compute the snapshot effective time as the snapshot reference time to use. Similarly, if the target TOD component(s) currently have an offset set, these could be read as well. This might be desired in situations where a process is to determine whether a TOD component is already synched (and correct it if out of sync), for example.

4. Using the read snapshot times, the process synchronizes the target TOD component(s) to the reference time. For example, for each of the target TOD components, the synchronizing synchronizes the effective time of the target TOD component to the reference time by determining an individual offset value for the target TOD component and then configuring the target TOD component with the offset value. Configuring the respective offset of each target TOD component sets the offset to be a difference between the snapshot local time of the target TOD component and the snapshot of the reference time. This could be done by providing the snapshot of the reference time to the target TOD component or calculating and providing an offset to the target TOD component for setting in the offset register, for instance. At this point, each of the TOD components has a matching effective time, which is the reference time.

If any of the controllers of the system are to be serviced, aspects of the above can be redone after the service in order to resynchronize the affected TOD component(s). The offsets of the other TOD components may remain unchanged on account that those offset continue to correct their local times to the proper effective/reference time. Thus, in some examples, the snapshotting could be done with respect to all of the TOD components (not just those affected by the servicing), but the synchronizing may be performed with a restriction that the offset values of these other TOD components that are already synchronized are to remain unaffected. In some examples, their effective times may still be computed and, if not matching to the reference time, their offsets could be updated/adjusted at that point, if desired.

The approach above can be accomplished with only minimal extension to existing TOD logic, in which an offset register is added and its contained value is used with the local time to provide an effective time that is to match to the reference time.

Figure 4:
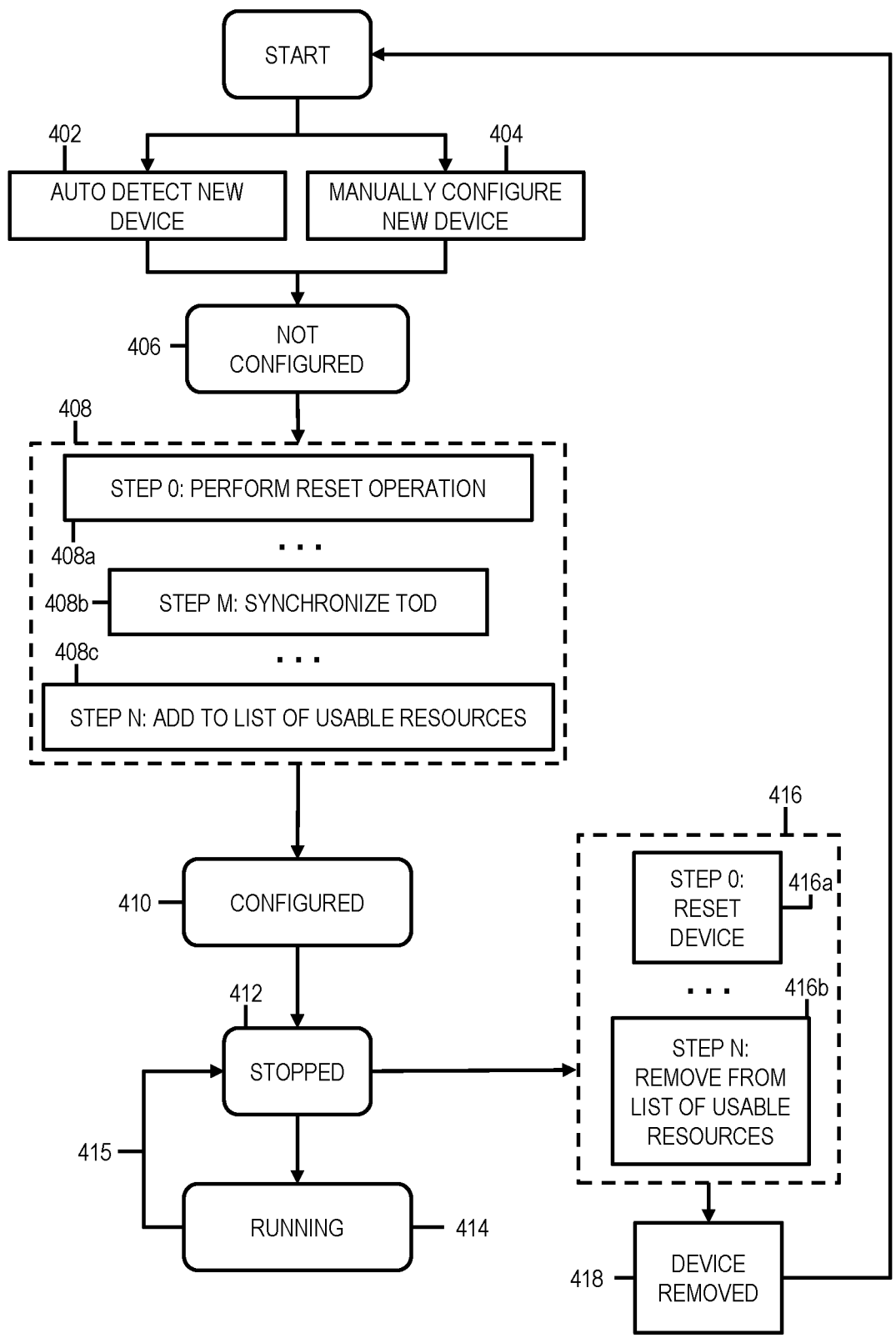
FIG. 4 depicts example processes for transitioning system devices between stopped, configured, and running states, in accordance with aspects described herein.

FIG. 4 depicts example processes for transitioning system devices, for instance (but not limited to) a device added to a quantum system and having an associated TOD component, between stopped, configured, and running states, in accordance with aspects described herein. Referring to FIG. 4, the process automatically detects a new device (402) or a new device is manually configured (404). At this point the device is in a non-configured state 406. The process then enters a configuration sub-process 408 in which the device undergoes (408a) a reset operation, the TOD component is synchronized (408b) in accordance with aspects described herein, and the device is added (408c) to a list of usable resources. This transitions the device into a configured state (410) in which it is synchronized to the system reference time and ready for assigning. At this point, the device is also in a stopped state 412. At some point thereafter, the device transitions to a running state 414. In a specific example, the device has been assigned to a partition, for instance a set of controllers responsible for driving a set of qubits on a quantum chip, and the device enters the running state 414 when the partition is started.

At some point thereafter, the device is stopped and returns (415) to the stopped state 412. As an example, the partition is stopped. The could again start the device to return it to the running state 414. Alternatively, process could proceed to sub-process 416 in which the device is reset (416a) and removed (416b) from the list of usable resources. This removes (418) the device from the system. If at some later time the system is to again use the device again, the device can be brought up by returning to the start of the process of FIG. 4. It is noted that once the device is configured, certain types of reconfiguration of the device may only be performed after the device has returned to the non-configured state 406. For instance, if the device is to be resynchronized to a reference time as described herein, the device may need to be stopped (e.g., if not already stopped, and to ensure that any related TOD components are not in use by any running load at the time) and transitioned to the non-configured state 406 before being again configured per 408.

In a specific embodiment of a quantum system, each FPGA (as that is the unit that may receive the clock signal to drive TOD of the system) could include a respective TOD component. After power-on of an FPGA, its TOD component can produce a local time advanced by the clock signal. The local time can either start counting by itself or could start counting based on being triggered by firmware during operating system boot, as examples. Each time an FPGA comes up (boots), for instance as a new FPGA being added to the system or an existing FPGA that was serviced/restarted/restored and is to be resynchronized, the snapshot functionality as described herein can be used to snapshot the local time of the TOD components of the FPGAs of the system, including the TOD component of the booting FPGA. This TOD component is taken as a target TOD component to synchronized to the reference time. The snapshot local times of the TOD components can then be read. In addition, if desired, the offsets of already-synchronized FPGAs can be read from their TOD components. Except the FPGA just being booted, each other FPGA should present matching effective times (e.g., snapshot local time+offset), as the reference time. In this regard, any already-synchronized TOD component could be regarded as the reference TOD component if desired, though in some examples one of them is explicitly identified as the reference TOD component. In any case, a snapshot of the reference time is determined from the appropriate TOD component, and the process computes/configures a new offset for the target TOD component of the FPGA being added/resynchronized. The offset is set such that it is the difference between the snapshot local time of the target TOD component and the snapshot of the reference time.

Accordingly, methods are provided for synchronizing time-of-day between a plurality of TOD components for controllers of a system, each of the TOD components being driven from the common oscillator/clock. Example such methods include a synchronizing component issuing an order to each of the TOD components to synchronously snapshot their local times while their clocks (e.g. internal counters) continue to increment. The issued order may be mediated by a delay-matched pulse distributed to each of the TOD components, in order to compensate for pulse propagation delays. As part of the method, one of the TOD components may be identified as a reference TOD component to provide a snapshot of the reference time to which the other TOD components, as target TOD components, are to be synchronized. The reference time may be taken to be the reference TOD component's snapshot effective time, which could be taken as the snapshot of the local time of the reference TOD component or a function (e.g., sum) of the snapshot local time and an offset with which the reference TOD is configured. The synchronizing component can instruct each of the target TOD components to adopt the reference time using the snapshot of the reference time. In one embodiment of this, the synchronizing component provides/sends the snapshot reference time to each of the target TOD components, with each of the target TOD components, while their clocks continue to increment, determining and setting an offset as the difference between the snapshot reference time and the snapshot local time. The TOD components can be configured in operation to adjust their local time by the offset to produce an effective time that is taken to be the current system TOD.

In another embodiment of each of the target TOD components adopting the reference time, the synchronizing component can, for each of the target TOD component(s), collect/receive the snapshot local time of the target TOD component, determine the offset for the target TOD component as the difference between the snapshot local time of the target TOD component and the snapshot of the reference time, and distribute the offset to the target TOD component.

As noted, the synchronization need not be performed for whichever TOD components are already synchronized to the reference time, regardless whether the snapshot order directed them to snapshot their local time.

Aspects described herein enable independent addition/removal of TOD components without the need for total resynchronization, i.e., resynchronizing each other TOD component of the system. At any time a synchronization of TOD components is needed, processing can initially ensure that the local time(s) of the TOD component(s) are progressing (and if not, then start them, which need not be synchronously done), then snapshot the local time(s) of the TOD component(s) at a point in time using the snapshot function, determine appropriate offsets relative to a snapshot time taken to be the reference time at the same point in time, and set/update the offset of any target TOD component such that its snapshot local time+offset is equal to the snapshot reference time.

Below in Table 5 is an example set of TOD component data at a point in time for 5 TOD components of a system after synchronization:

TABLE 5

| Component Name | Local time | Offset | Effective time |
|---|---|---|---|
| CLARA | 9440259860231 | 0 | 9440259860231 |
| LUDWIG | 9440259860231 | 0 | 9440259860231 |
| JOHANN | 9312923547519 | 127336312712 | 9440259860231 |
| FANNY | 9050051453519 | 390208406712 | 9440259860231 |
| WOLFGANG | 8991326419727 | 448933440504 | 9440259860231 |

In the above example, the effective time of the first two TOD components, CLARA and LUDWIG, is taken as their local time. For example, these components may be legacy TOD components without offset functionality as described herein, or may be TOD components that for some other reason are used with a 0 offset (for instance, they could each be used as a reference TOD component for redundancy or other reasons). In any case, they have a 0 offset (or no offset at all) and their effective time is their local time, which match each other. As one example, these two components might have undergone an initial synchronization in which their local times are reset or otherwise initialized to a common initial value and then synchronously started so that their local times match and are used as reference time. In any case, after this initial synchronization of components CLARA and LUDWIG, the other three components, JOHANN, FANNY, and WOLFGANG, were brought up not necessarily at the same time. Each such component's offset was set accordingly based on snapshotting the component's local time and the reference time at a same point in time to determine and set the appropriate offset.

The above illustrates that embodiments can synchronize mixed systems where some of the TOD components devices operate with the offset logic and others do not, either because it is lacking or because it is desired to not utilize the offset logic for those. An example process for synchronizing these systems is to treat the TOD components not using the offset logic as if they always have an offset value of 0, which produces the equation effective time=local time+0 for the devices not using the offset logic. All such TOD components are initially synchronized with each other, for instance using a synchronous start method such that their local times are synchronized to each other and match. After this point, TOD components that operate with the offset logic can be added and synchronized with the existing synchronized TOD components by setting their offset appropriately, given how their local times compare to the reference time at any given point in time. If at some point a TOD component not using the offset logic is to be synchronized, the process can re-perform the initial synchronization for this TOD component and any others not using the offset logic, then resynchronize the rest of the TOD components that use the offset logic. The controllers, devices, etc. associated with those TOD components using the offset logic need not be stopped, reset, restored, or the like, may remain running throughout, and may be seamlessly resynchronized to the new reference time.

Thus, a plurality of TOD components incorporating the offset logic described herein may be part of a larger collection of TOD components to be synchronized to the reference time. This larger collection can include the plurality of TOD components as well as other TOD component(s), i.e., one or more that do not use the offset logic. The synchronization of the plurality of TOD components can be performed based on (e.g., after) initially synchronizing these other TOD component(s) to the reference time, in which a local time of each of these other TOD component(s) is taken as the other TOD component's effective time, is initialized to a common initial value, and is started (synchronously if there is more than one) so that the local time of each of these other TOD component(s) matches (to the extent there is more than one) and is used as the reference time.

Figure 5:
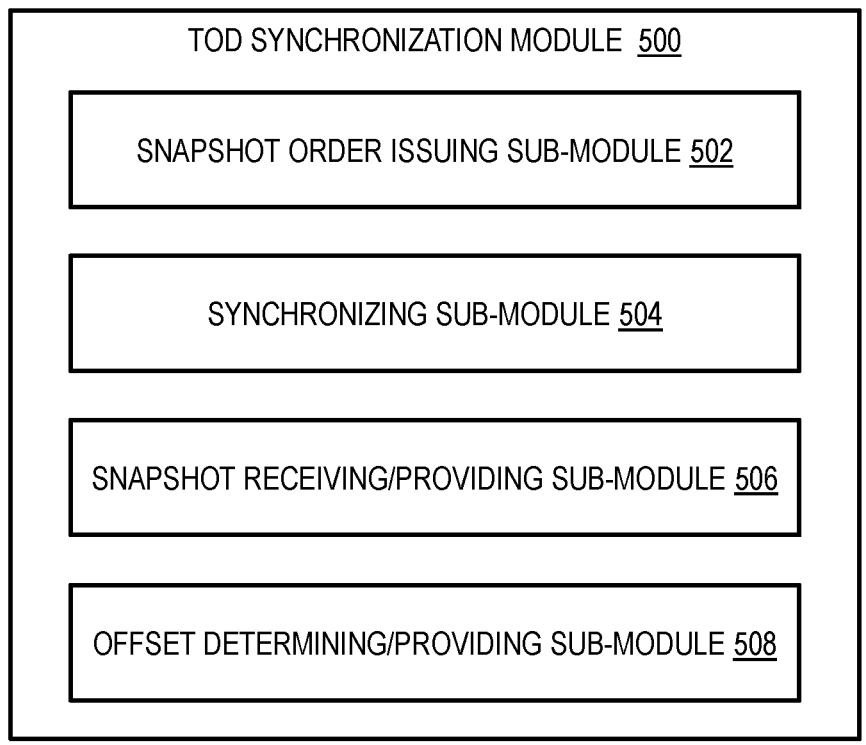
FIG. 5 depicts further details of an example TOD synchronization module to incorporate and/or use aspects described herein.

FIG. 5 depicts further details of an example TOD synchronization module (e.g., TOD synchronization module 500 of FIG. 1) to incorporate and/or use aspects described herein. In one or more aspects, TOD synchronization module 500 includes, in one example, various sub-modules to be used to perform synchronization processing. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples. As noted previously, in some embodiments the TOD synchronization module is implemented in whole or in part using any appropriate combination of hardware and/or software, including, for instance, programmable logic.

Referring to FIG. 5, TOD synchronization module 500 includes: a snapshot order issuing sub-module 502 for issuing an order for TOD components of a system, the order directing the TOD components to synchronously snapshot their local times; a synchronizing sub-module 504 for synchronizing TOD components to a reference time; a snapshot receiving/providing sub-module 506 for receiving snapshot local times of TOD components and/or providing a snapshot of the reference time to TOD components; and an offset determining/providing sub-module 508 for determining offsets for TOD components and distributing the offsets to the TOD components.

Figure 6:
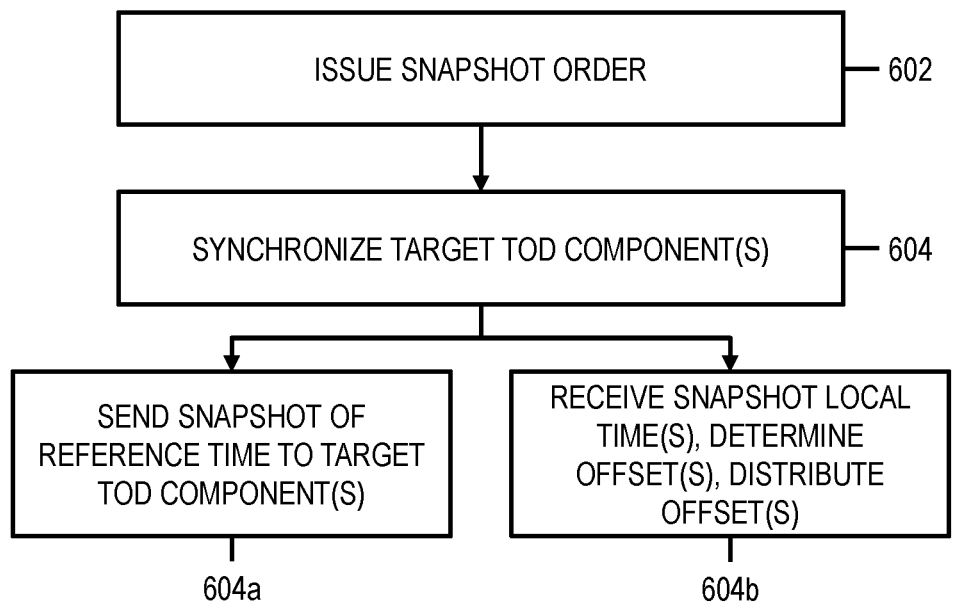
FIG. 6 depicts an example process for synchronizing a time-of-day between TOD components, in accordance with aspects described herein.

FIG. 6 depicts an example process for synchronizing a TOD between TOD components, in accordance with aspects described herein. The process may be executed, in one or more examples, by a processor or processing circuitry of one or more computers, computer systems, devices, logic units, or the like, such as those described herein, including those described with reference to FIG. 1. In one example, code or instructions implementing the process(es) of FIG. 6 are part of a module, such as module 500. In other examples, the code may be included in one or more modules and/or in one or more sub-modules of the one or more modules. Various options are available.

The process of FIG. 6 includes issuing (602), by a synchronizing component, an order for a plurality of TOD components of a system. The plurality of TOD components includes a reference TOD component and one or more target TOD components to be synchronized to a reference time provided by the reference TOD component. Each TOD component of the plurality of TOD components can include a local time and an offset that are independent of each other TOD component of the plurality of TOD components and their local times/offsets. Each TOD component of the plurality of TOD components includes also an effective time as a function, e.g., sum, of the local time and the offset of the TOD component. The effective time of the reference TOD component is the reference time to which the one or more target TOD components are to be synchronized. The issued order directs each TOD component of the plurality of TOD components to synchronously, at a point in time, snapshot its local time as the local times of the plurality of TOD components continue to progress. The snapshot local time of the reference TOD component together with the offset of the reference TOD component provide a snapshot of the effective time of the reference TOD component, and thus a snapshot of the reference time, at the point in time.

The process of FIG. 6 then synchronizes (604) the one or more target TOD components to the reference time. The synchronizing synchronizes, for each target TOD component of the one or more target TOD components, the effective time of the target TOD component to the reference time by setting the offset of the target TOD component as a difference between the snapshot local time of the target TOD component and the snapshot of the reference time. Based on the synchronizing, the effective times of the plurality of TOD components match and are the reference time.

In examples, a target TOD component of the one or more target TOD components maintains its offset in a register associated with the target TOD component. The register could be part of the TOD component itself or could be part of another unit of which the TOD component is a part, as examples. In any case, the offset and the snapshot local time of a target TOD component can be made separately accessible to external components so that the external components can access the snapshot local time or the offset as desired. It may be desired to read-out either or both of these selectively.

In some examples, the one of more target TOD components can include multiple target TOD components, and the process of FIG. 6 is performed as part of an initial synchronization to synchronize the plurality of TOD components to the reference time. The issuing can issue the order for the multiple target TOD components, and the synchronizing can synchronize each of the multiple target TOD components to the reference time as part of the initial synchronization.

The synchronizing 604 can proceed in two example approaches. Continuing to refer to FIG. 6, at 604a the synchronizing the target TOD component(s) synchronizes, for each of them, their effective time to set the offset by the synchronizing component sending the snapshot of the reference time to the one or more target TOD components, which enables the target TOD components to identify and store the proper offset. Alternatively, referring to 604b, the synchronizing the target TOD component(s) synchronizes, for each of them, their effective time to set the offset by the synchronizing component performing, for each target TOD component of the one or more target TOD components: receiving the snapshot local time of the target TOD component, determining the offset for the target TOD component as the difference between the snapshot local time of the target TOD component and the snapshot of the reference time, and distributing the offset determined for the target TOD component to the target TOD component.

In some examples, the one or more target TOD components are being initially configured and synchronized to the reference time (for instance a new components) or are being resynchronized to the reference time, for instance after a service and restore.

The plurality of TOD components can further include at least one TOD component that is already synchronized to the reference time. The synchronizing can identify the at least one TOD component as being already synchronized, and set the offset for the one or more target TOD components, which are those that are not already synchronized to the reference time. In a specific example in which a synchronized TOD component is determined to have become out of sync with the reference time (for instance it has an improper offset), this TOD component can be considered a target TOD component to be resynchronized.

In some examples, the synchronizing component is a target TOD component of the one or more target TOD components. The synchronizing component (target TOD component) can issue the order for at least (i) itself to snapshot its local time and (ii) the reference TOD component to provide a snapshot of the reference time. The synchronizing can synchronize, for this target TOD component, its effective time to set the offset by obtaining the snapshot of the reference time, determining its offset as a difference between the snapshot of the reference time and its snapshot of its local time, and setting its offset as the difference. If there are other target TOD component(s) to synchronize, the target TOD component serving as the synchronizing component in this example can perform the synchronizing for those other target TOD component(s).

The synchronizing aspects of FIG. 6 can be incorporated with conventional synchronizing practices, for instance to produce a collection of TOD components, some of which utilize the offset approach discussed herein and some of which do not, that are synchronized to the reference time. Thus, the plurality of TOD components (for which the order is issued) may be part of a collection of TOD components to be synchronized to the reference time. The issuing and synchronizing the one or more target TOD components may be performed based on initially synchronizing one or more other TOD components, of the collection of TOD components, to the reference time. In this initial synchronization, a local time of each other TOD component of the one or more other TOD components is taken as effective time of the other TOD component, and the local time of each of the one or more other TOD components is initialized to a common initial value and synchronously started so that the local time of each of the one or more other TOD components matches and is used as the reference time. Based on this, one or more target TOD components may be synchronized as described using offset values determined based on snapshotting the local times of the target TOD component(s).

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    issuing, by a synchronizing component, an order for a plurality of time-of-day (TOD) components of a system, the plurality of TOD components comprising (i) a reference TOD component and (ii) one or more target TOD components to be synchronized to a reference time provided by the reference TOD component, each TOD component of the plurality of TOD components comprising a local time and an offset that are independent of each other TOD component of the plurality of TOD components, wherein each TOD component of the plurality of TOD components comprises an effective time as a sum of the local time and the offset of the TOD component, wherein the effective time of the reference TOD component is the reference time to which the one or more target TOD components are to be synchronized, wherein the order directs each TOD component of the plurality of TOD components to synchronously, at a point in time, snapshot its local time as the local times of the plurality of TOD components continue to progress, wherein the snapshot local time of the reference TOD component together with the offset of the reference TOD component provide a snapshot of the effective time of the reference TOD component, and thus a snapshot of the reference time, at the point in time; and
    synchronizing the one or more target TOD components to the reference time, wherein the synchronizing synchronizes, for each target TOD component of the one or more target TOD components, the effective time of the target TOD component to the reference time by setting the offset of the target TOD component as a difference between the snapshot local time of the target TOD component and the snapshot of the reference time, wherein, based on the synchronizing, the effective times of the plurality of TOD components match and are the reference time.

2. The method of claim 1, wherein the one of more target TOD components includes multiple target TOD components, in which the issuing issues the order for the multiple target TOD components, and the synchronizing synchronizes each of the multiple target TOD components to the reference time as part of an initial synchronization to synchronize the plurality of TOD components to the reference time.

3. The method of claim 1, wherein the synchronizing comprises the synchronizing component sending the snapshot of the reference time to the one or more target TOD components.

4. The method of claim 1, wherein the synchronizing comprises, for each target TOD component of the one or more target TOD components, the synchronizing component:
    receiving the snapshot local time of the target TOD component;
    determining the offset for the target TOD component as the difference between the snapshot local time of the target TOD component and the snapshot of the reference time; and
    distributing the offset determined for the target TOD component.

5. The method of claim 1, wherein the one or more target TOD components are being initially configured and synchronized to the reference time or are being resynchronized to the reference time.

6. The method of claim 5, wherein the plurality of TOD components further comprises at least one TOD component already synchronized to the reference time, and wherein the synchronizing identifies the at least one TOD component as already synchronized, and sets the offset for the one or more target TOD components, of the plurality of TOD components, as those which are not already synchronized to the reference time.

7. The method of claim 5, wherein the synchronizing component is a target TOD component of the one or more target TOD components, in which the synchronizing component issues the order for at least (i) itself to snapshot its local time and (ii) the reference TOD component to provide a snapshot of the reference time, wherein the synchronizing component receives the snapshot of the reference time, determines its offset as a difference between the snapshot of the reference time and the snapshot of its local time, and sets its offset as the difference.

8. The method of claim 1, wherein the plurality of TOD components are part of a collection of TOD components to be synchronized to the reference time, wherein the issuing and synchronizing the one or more target TOD components are performed based on initially synchronizing one or more other TOD components, of the collection of TOD components, to the reference time, in which a local time of each other TOD component of the one or more other TOD components is taken as effective time of the other TOD component, the local time of each of the one or more other TOD components being initialized to a common initial value and synchronously started so that the local time of each of the one or more other TOD components matches and is used as the reference time.

9. The method of claim 1, wherein a target TOD component of the one or more target TOD components maintains its offset in a register associated with the target TOD component.

10. The method of claim 1, wherein the offset and the snapshot local time of a target TOD component of the one or more target TOD components are made separately accessible to external components.

11. A computer system comprising:
a memory; and
a processor in communication with the memory, wherein the computer system is configured to perform a method comprising:
issuing, by a synchronizing component, an order for a plurality of time-of-day (TOD) components of a system, the plurality of TOD components comprising (i) a reference TOD component and (ii) one or more target TOD components to be synchronized to a reference time provided by the reference TOD component, each TOD component of the plurality of TOD components comprising a local time and an offset that are independent of each other TOD component of the plurality of TOD components, wherein each TOD component of the plurality of TOD components comprises an effective time as a sum of the local time and the offset of the TOD component, wherein the effective time of the reference TOD component is the reference time to which the one or more target TOD components are to be synchronized, wherein the order directs each TOD component of the plurality of TOD components to synchronously, at a point in time, snapshot its local time as the local times of the plurality of TOD components continue to progress, wherein the snapshot local time of the reference TOD component together with the offset of the reference TOD component provide a snapshot of the effective time of the reference TOD component, and thus a snapshot of the reference time, at the point in time; and
synchronizing the one or more target TOD components to the reference time, wherein the synchronizing synchronizes, for each target TOD component of the one or more target TOD components, the effective time of the target TOD component to the reference time by setting the offset of the target TOD component as a difference between the snapshot local time of the target TOD component and the snapshot of the reference time, wherein, based on the synchronizing, the effective times of the plurality of TOD components match and are the reference time.

12. The computer system of claim 11, wherein the one of more target TOD components includes multiple target TOD components, in which the issuing issues the order for the multiple target TOD components, and the synchronizing synchronizes each of the multiple target TOD components to the reference time as part of an initial synchronization to synchronize the plurality of TOD components to the reference time.

13. The computer system of claim 11, wherein the synchronizing comprises the synchronizing component sending the snapshot of the reference time to the one or more target TOD components.

14. The computer system of claim 11, wherein the synchronizing comprises, for each target TOD component of the one or more target TOD components, the synchronizing component:
receiving the snapshot local time of the target TOD component;
determining the offset for the target TOD component as the difference between the snapshot local time of the target TOD component and the snapshot of the reference time; and
distributing the offset determined for the target TOD component.

15. The computer system of claim 11, wherein the one or more target TOD components are being initially configured and synchronized to the reference time or are being resynchronized to the reference time.

16. The computer system of claim 11, wherein the plurality of TOD components are part of a collection of TOD components to be synchronized to the reference time, wherein the issuing and synchronizing the one or more target TOD components are performed based on initially synchronizing one or more other TOD components, of the collection of TOD components, to the reference time, in which a local time of each other TOD component of the one or more other TOD components is taken as effective time of the other TOD component, the local time of each of the one or more other TOD components being initialized to a common initial value and synchronously started so that the local time of each of the one or more other TOD components matches and is used as the reference time.

17. A computer program product comprising:
a computer readable storage medium readable by a processing circuit and storing instructions for execution by the processing circuit to:
issue an order for a plurality of time-of-day (TOD) components of a system, the plurality of TOD components comprising (i) a reference TOD component and (ii) one or more target TOD components to be synchronized to a reference time provided by the reference TOD component, each TOD component of the plurality of TOD components comprising a local time and an offset that are independent of each other TOD component of the plurality of TOD components, wherein each TOD component of the plurality of TOD components comprises an effective time as a sum of the local time and the offset of the TOD component, wherein the effective time of the reference TOD component is the reference time to which the one or more target TOD components are to be synchronized, wherein the order directs each TOD component of the plurality of TOD components to synchronously, at a point in time, snapshot its local time as the local times of the plurality of TOD components continue to progress, wherein the snapshot local time of the reference TOD component together with the offset of the reference TOD component provide a snapshot of the effective time of the reference TOD component, and thus a snapshot of the reference time, at the point in time; and synchronize the one or more target TOD components to the reference time, wherein the synchronizing synchronizes, for each target TOD component of the one or more target TOD components, the effective time of the target TOD component to the reference time by setting the offset of the target TOD component as a difference between the snapshot local time of the target TOD component and the snapshot of the reference time, wherein, based on the synchronizing, the effective times of the plurality of TOD components match and are the reference time.

18. The computer program product of claim 17, wherein the one of more target TOD components includes multiple target TOD components, in which the issuing issues the order for the multiple target TOD components, and the synchronizing synchronizes each of the multiple target TOD components to the reference time as part of an initial synchronization to synchronize the plurality of TOD components to the reference time.

19. The computer program product of claim 17, wherein the synchronizing comprises:
  (i) sending the snapshot of the reference time to the one or more target TOD components; or
  (ii) for each target TOD component of the one or more target TOD components:
    receiving the snapshot local time of the target TOD component;
    determining the offset for the target TOD component as the difference between the snapshot local time of the target TOD component and the snapshot of the reference time; and
    distributing the offset determined for the target TOD component.

20. The computer program product of claim 17, wherein the plurality of TOD components are part of a collection of TOD components to be synchronized to the reference time, wherein the issuing and synchronizing the one or more target TOD components are performed based on initially synchronizing one or more other TOD components, of the collection of TOD components, to the reference time, in which a local time of each other TOD component of the one or more other TOD components is taken as effective time of the other TOD component, the local time of each of the one or more other TOD components being initialized to a common initial value and synchronously started so that the local time of each of the one or more other TOD components matches and is used as the reference time.

* * * * *